United States Patent [19]

Ito

[11] Patent Number: 5,142,556
[45] Date of Patent: Aug. 25, 1992

[54] DATA TRANSFER SYSTEM AND METHOD OF TRANSFERRING DATA

[75] Inventor: Hideaki Ito, Yokohama, Japan
[73] Assignee: Kabushiki Kaisha Toshiba, Japan
[21] Appl. No.: 630,243
[22] Filed: Dec. 19, 1990
[30] Foreign Application Priority Data Dec. 21, 1989 [JP] Japan .................................. 1-329709

[51] Int. Cl.⁵ .......................... H04L 7/00; H04L 25/38
[52] U.S. Cl. .................... 375/106; 375/117; 307/269
[58] Field of Search ........................ 375/106, 107, 117; 370/48, 49; 307/269, 480

[56] References Cited

U.S. PATENT DOCUMENTS

| | | | |
|---|---|---|---|
| 4,782,481 | 11/1988 | Eaton | 375/117 |
| 4,847,867 | 7/1989 | Nasu et al. | 375/106 |
| 4,964,141 | 10/1990 | Matsushima et al. | 375/106 |

Primary Examiner—Benedict V. Safourek
Assistant Examiner—Temesghen Ghebietinsae
Attorney, Agent, or Firm—Banner, Birch, McKie & Beckett

[57] ABSTRACT

This invention discloses a data transfer system comprising a data transfer apparatus for transmitting clock signals and binary serial data signals, a clock signal-transfer line connected to the data transfer apparatus, a data signal-transfer line connected to the data transfer apparatus, and at least one data receiving terminal unit connected to the clock signal-transfer line and data signal-transfer line, the data receiving terminal unit regarding the data signal transmitted from data transfer apparatus as a transfer start signal when it detects that the data signal transmitted at the time corresponding to the leading edge of the clock signal transmitted from the apparatus has the first logic level, and that the data signal transmitted at the time corresponding to the trailing edge of the same has the second logic level, also regarding the data signal as a transfer data signal when it detects that the data signal transmitted at the time corresponding to the leading edge of the clock signal has the same logic level as that transmitted at the time corresponding to the trailing edge of the same, and further regarding the data signal as a transfer end signal when it detects that the data signal transmitted at the time corresponding to the leading edge of the clock signal has the second logic level, and that the data signal transmitted at the time corresponding to the trailing edge of the same has the first logic level.

19 Claims, 3 Drawing Sheets

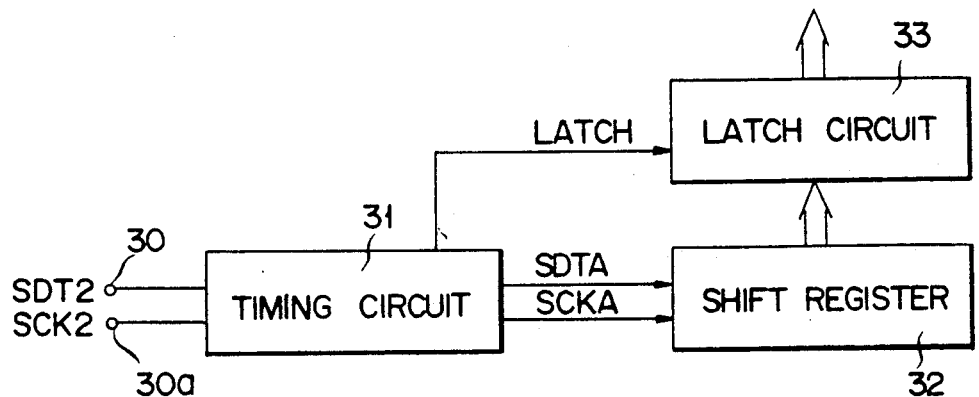
F I G. 3
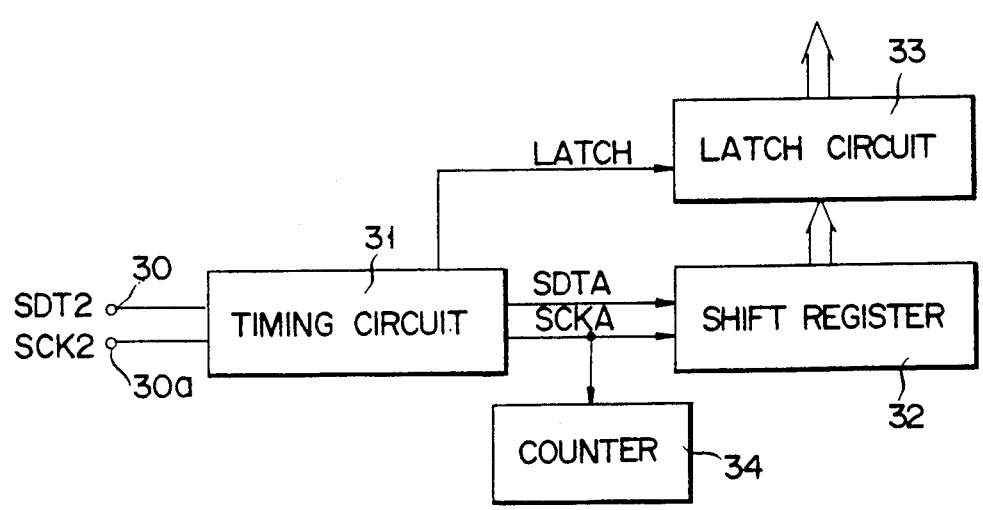
F I G. 4
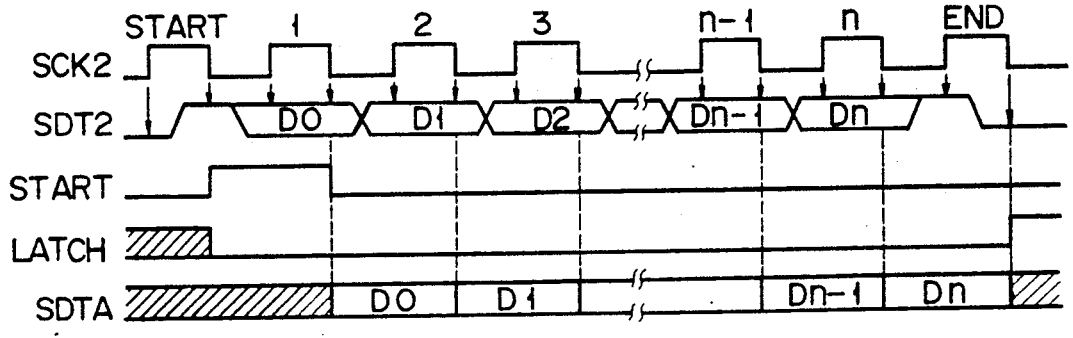
F I G. 5

DATA TRANSFER SYSTEM AND METHOD OF TRANSFERRING DATA

BACKGROUND OF THE INVENTION

1. Field of the Invention

This invention relates to a data transfer system for use in, for example, a video tape recorder, which transfers data from a microcomputer incorporated in the recorder to an integrated circuit for controlling a servomotor incorporated therein.

2. Description of the Related Art

Published Unexamined Japanese Patent Application No. 57-106262 discloses two types of data transfer systems. The first type employs two transfer lines for transmitting a clock signal and a data signal, respectively. The second type is identical to the first type, except that it has one more line for controlling the start and finish of data transmission.

More specifically, the first-type system comprises a data transfer apparatus for transmitting clock signal and binary serial-data signals, a bidirectional bus having two lines connected to the data transfer apparatus, and a plurality of data transfer/receiving terminal units connected to the bus. Each of the terminal units has two terminals, one for receiving a signal from the bidirectional bus, and the other for transmitting a signal in reply to the signal received.

Since each of the data transfer/receiving terminal units requires transfer/receiving terminals connected to the bus, respectively, the system inevitably has a complex hardware structure.

Further, the data transfer apparatus transmits a data signal which has identical logic levels at times corresponding to the leading and trailing edges of a clock signal, but does not transmit a sub-data signal which has logic levels temporarily inverted at any time between the leading and trailing edges of the clock signal. With this structure, it is impossible to transmit lots of data.

On the other hand, the second-type system requires as many as three transfer lines.

SUMMARY OF THE INVENTION

It is the object of the invention to provide a data transfer system which employs two transfer lines, and data receiving terminal units having only receiving terminals for the lines, resulting in a simple hardware structure, and to provide a data transfer method which enables the system of simple structure to accurately control the start and finish of data transmission.

To attain the above object, the data transfer system of the invention comprises:

a data transfer apparatus (1) for transmitting clock signals ($SCK_1$) and binary data signals ($SDT_1$), the data signals being transmitted in serial order, of which a signal transmitted at the start has a first logic level at a time corresponding to a leading edge of a clock signal ($SCK_1$) and a second logic level at a time corresponding to a trailing edge of the same, signals transmitted after the start have identical logic levels at times corresponding to the leading edge and trailing edge of the transfer clock signal, and a signal transmitted at the edge has the second level at the time corresponding to the leading edge of the cock signal and the first logic level at the time corresponding to the trailing edge of the same;

a clock signal-transfer line (2) connected to the data transfer apparatus (1);

a data signal-transfer line (2a) connected to the data transfer apparatus (1); and at least one data receiving terminal unit (3) connected to the clock signal-transfer line (2) and data signal-transfer line (2a), the data receiving terminal unit (3) regarding the data signal ($SDT_2$) transmitted from data transfer apparatus (1) as a transfer start signal (START) when it detects that the data signal ($SDT_2$) transmitted at the time corresponding to the leading edge of the clock signal ($SCK_2$) transmitted from the apparatus (1) has the first logic level, and that the data signal ($SDT_2$) transmitted at the time corresponding to the trailing edge of the same has the second logic level, also regarding the data signal ($SDT_2$) as a transfer data signal when it detects that the data signal ($SDT_2$) transmitted at the time corresponding to the leading edge of the clock signal ($SCK_2$) has the same logic level as that transmitted at the time corresponding to the trailing edge of the same, and further regarding the data signal ($DST_2$) as a transfer end signal (END) when it detects that the data signal ($SDT_2$) transmitted at the time corresponding to the leading edge of the clock signal ($SCK_2$) has the second logic level, and that the data signal ($SDT_2$) transmitted at the time corresponding to the trailing edge of the same has the first logic level.

According to another aspect of the invention, a method of transmitting data is provided which comprises the steps of:

transmitting clock signal ($SCK_1$) from a date transfer apparatus (1) to at least one receiving terminal unit (3) connected to the apparatus (1) via a clock signal-transfer line (2);

transmitting binary data signals ($SDT_1$) in serial order from the data transfer apparatus (1) to the receiving terminal unit (3) connected to the apparatus (1) via a data signal-transfer line (2a);

making the data transfer apparatus (3) regard the data signal ($SDT_2$) transmitted from data transfer apparatus (1) as a transfer start signal (START) when the apparatus (3) detects that the data signal ($SDT_2$) transmitted at a time corresponding to a leading edge of a clock signal ($SCK_2$) transmitted from the apparatus (1) has a first logic level, and that the data signal ($SDT_2$) transmitted at a time corresponding to a trailing edge of the same has a second logic level;

making the apparatus (3) regard the data signal ($SDT_2$) as a transfer data signal when it detects that the data signal ($SDT_2$) transmitted at the time corresponding to the leading edge of the clock signal ($SCK_2$) has the same logic level as that transmitted at the time corresponding to the trailing edge of the same; and making the apparatus (3) regard the data signal ($SDT_2$) as a transfer ed signal (END) when it detects that the data signal ($SDT_2$) transmitted at the time corresponding to the leading edge of the clock signal ($SCK_2$) has the second logic level, and that the data signal ($SDT_2$) transmitted at the time corresponding to the trailing edge of the same has the first logic level.

According to the invention constructed as above, the start time of data transmission, the end time thereof, and the time therebetween are determined by comparing logic levels of a data signal ($SDT_2$) assumed at times corresponding to the leading and trailing edges of a clock signal ($SCK_2$), so that the start and end of the data transmission can be controlled by using only two transfer lines (2, 2a). In addition, each data receiving terminal unit (3) has only receiving terminals connected to the transfer lines (2, 2a), resulting in a simple hardware structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

Figure 1:
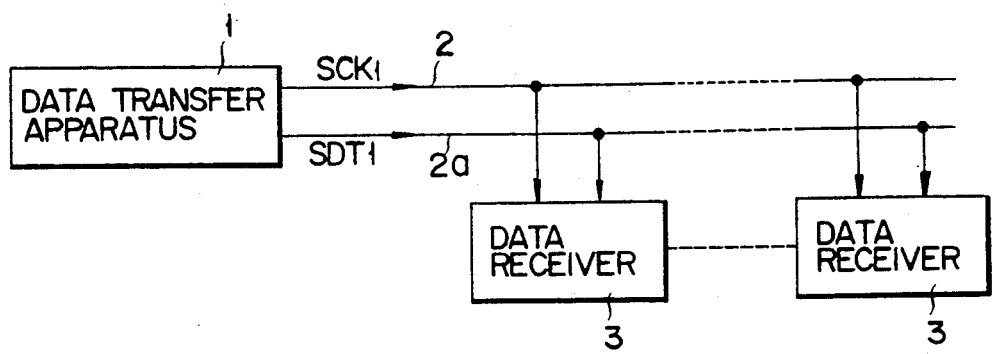
FIG. 1 is a block diagram, showing a data transfer apparatus according to an embodiment of the present invention.
Figure 2:
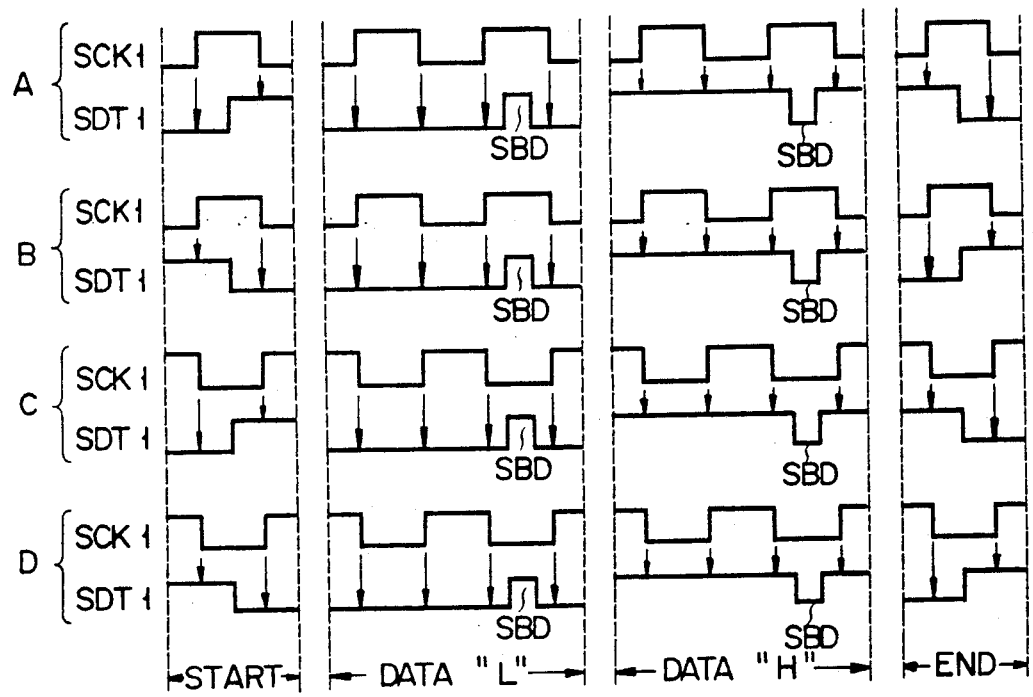
Figure 6:
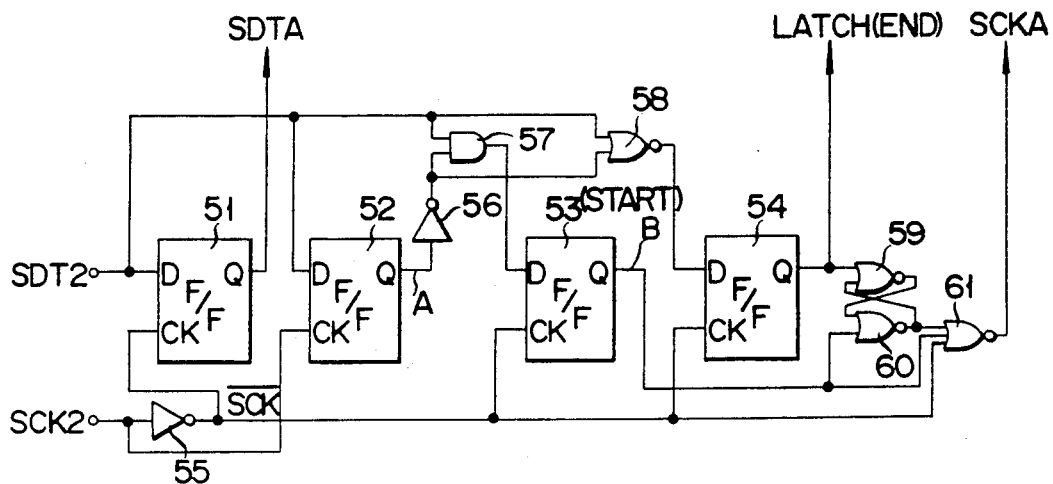

A–D of FIG. 2 are waveform charts, showing the relationship between the logic levels of data signals transmitted from the data transfer apparatus shown in FIG. 1 and the leading/trailing edges of clock signals transmitted from the same;

FIG. 3 is a circuit diagram of a data receiver shown in FIG. 1;

FIG. 4 is a circuit diagram of another data receiver shown in FIG. 1;

FIG. 5 is a waveform chart, showing the operation of data receiving terminal units shown in FIGS. 3 and 4;

FIG. 6 is a circuit diagram of a timing circuit shown in FIGS. 3 and 4; and

Figure 7:
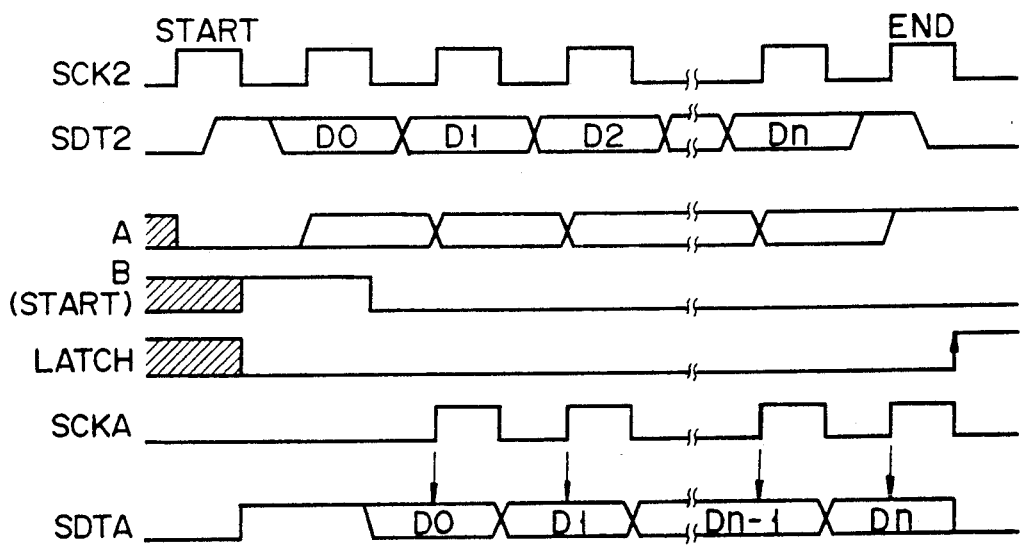

FIG. 7 is a waveform chart, showing the operation of the timing circuit shown in FIG. 6.

DETAILED DESCRIPTION OF THE PREFERRED EMBODIMENT

The invention will now be explained in detail with reference to the accompanying drawings showing an embodiment thereof.

FIG. 1 shows that data transfer system for use in, for example, a video tape recorder, which transmits data from a microcomputer incorporated in the recorder to an integrated circuit for controlling a servomotor incorporated therein. In the FIGURE, reference numeral 1 denotes a data transfer apparatus for transmitting transfer clock signals $SCK_1$ and binary transfer data signals $SDT_1$, reference numerals 2 and 2a a clock signal-transfer line and a data signal-transfer line, both connected to the data transfer apparatus 1, and reference numeral 3 a plurality of data-receiving terminal units for receiving the transfer clock signals $SCK_1$ and binary transfer data signals $SDT_1$ transmitted through the lines 2 and 2a.

At the start of transmission of the transfer data signal $SDT_1$, the data transfer apparatus 1 generates a transfer start signal START having logic levels which are different at times corresponding to the leading edge and trailing edge of a clock signal $SCK_1$. During the transmission of the signal $SDT_1$, the apparatus 1 generates, in serial order, signals $SDT_1$ having logic levels which are identical at times corresponding to the leading edge and trailing edge of each clock signal $SCKP_1$. The logic level of the transfer data signal $SDT_1$ is usually inverted at a time between the trailing edge of a certain one of the transfer clock signals $SCK_1$ and the leading edge of the following one. At the end of transmission, the apparatus 1 generates a transfer end signal END having logic levels inverted at times corresponding to the leading edge and trailing edge of the clock signal $SCK_1$. It should be noted that the logic level of the transfer end signal END changes in the opposite way to that of the transfer start signal START.

The above-described structure of the data transfer apparatus 1 comprising a microcomputer or the like is known to those skilled in the art.

A–D of FIG. 2 show four examples of the relationship between the logic level of the transfer data signal $SDT_1$ and the leading and trailing edges of the transfer clock signal $SCK_1$. Specifically, A of FIG. 2 shows one example. In the FIGURE, at the start of the transmission, the transfer data signal $SDT_1$ has a low level "L" at the rise of the transfer clock signal $SCK_1$, and a high level "H" at the fall of the same. During the transmission, for example, a signal of low level "L" containing 2-bit data is transmitted, and then a signal of high level "H" containing 2-bit data is transmitted. At the end of the transfer, the level of the signal $SDT_1$ is high at the rise of the transfer clock signal $SCK_1$, and becomes low at the fall of the same.

B of FIG. 2 shows another example. At the start of the transmission, the level of the transfer data signal $SDT_1$ is high at the rise of the transfer clock signal $SCK_1$, and becomes low at the fall of the same. During the transmission, for example, a signal of low level "L" containing 2-bit data is transmitted, and then a signal of high level "H" containing 2-bit data is transmitted. At the end of the transmission, the level of the signal $SDT_1$ is low at the rise of the transfer clock signal $SCK_1$, and becomes high at the fall of the same.

Further, as is shown in C of FIG. 2, at the start of the transfer, the level of the transfer data signal $SDT_1$ is low at the fall of the transfer clock signal $SCK_1$, and becomes high at the rise of the same. During the transmission, for example, a signal of low level "L" containing 2-bit data is transmitted, and then a signal of high level "H" containing 2-bit data is transmitted. At the end of the transmission, the level of the signal $SDT_1$ is high at the fall of the transfer clock signal $SCK_1$, and becomes low at the rise of the same.

Finally, as is shown in D of FIG. 2, at the start of the transmission, the level of the transfer data signal $STD_1$ is high at the fall of the transfer clock signal $SCK_1$, and becomes low at the rise of the same. During the transmission, for example, a signal of low level "L" containing 2-bit data is transmitted, and then a signal of high level "H" containing 2-bit data is transmitted. At the end of the transmission, the level of the signal $SDT_1$ is low at the fall of the transfer clock signal $SCK_1$, and becomes high at the rise of the same.

In A–D of FIG. 2, if the logic level of the transfer data signal $SDT_1$ is temporarily inverted between the leading and trailing edges of the transfer clock signal $SCK_1$, the data can be considered normal.

The data-receiving terminal units 3 have signal-receiving terminals connected to the transfer lines 2 and 2a, and is constructed as follows:

The transfer data signal $SDT_1$ and transfer clock signal $SCK_1$ transmitted from the data transfer apparatus 1 are hereinafter referred to as "received data signal $SDT_2$" and "received clock signal $SCK_2$", respectively. When each data-receiving terminal unit 3 detects that the logic level of the received data signal $SDT_2$ has been changed from a first value to a second value between the leading edge and trailing edge of the received clock signal SCK$_2$, the unit 3 regards the signal as the transfer start signal START, and starts to receive the following signals. Subsequently, when it detects that the logic level of the following received data signal SDT$_2$ is not changed between the leading edge and trailing edge of the received clock signal SCK$_2$, it regards the signal as a received data signal D$_0$. Further, when it detects that the logic level of the received data signal SDT$_2$ has been changed from the second value to the first value between the leading edge and trailing edge of the received clock signal SCK$_2$, it regards the signal as the transfer end signal END.

FIG. 3 shows an example of the data receiving terminal unit 3 comprising an integrated circuit. Reference numerals 30a and 30 denote a clock-receiving terminal and a data-receiving terminal which are connected to the transfer lines 2 and 2a, respectively. A timing circuit 31 receives the clock signal SCK$_2$ and serial data signal SDT$_2$ through the receiving terminals 30 and 30a. Upon detection of the transfer start signal START, the circuit 31 starts to receive the following signals. Then, upon receipt of the following clock signal SCK$_2$ and serial data signal SDT$_2$, it generates clock signals SCKA and a data signals SDTA. Further, upon detection of the transfer end signal END, it stops generating the signals SCKA and SDTA, and simultaneously activates a latch signal LATCH. A shift register 32 receives the data signals SDTA in serial order and in synchronism with the respective leading edges of the clock pulses SCKA. Upon activation of the latch signal LATCH, a latch circuit 33 latches the data transmitted from the shift register 32, also decodes the serial data to parallel data, and further transmits them to a circuit contained in the integrated circuit.

As is shown in FIG. 4, the data receiving terminal unit 3 may be modified such that it detects the number of bits of data transmitted from the generation of the transfer start signal START to that of the transfer end signal END by counting the clock signals SCKA by means of a counter 34, and receives the transfer data only if the number of the bits counted meets a predetermined value. In this case, a plurality of data receiving terminal units 3 can select respective particular data, if each unit is set to receive that signal of a particular number of bits which indicates a corresponding data.

FIG. 5 shows the operation of the data receiving terminal unit 3 performed when it receives those clock signals SCK$_1$ and serial data signals SDT$_1$ which are transmitted from the data transfer apparatus 1 at the timing shown in A of FIG. 2. The unit 3 regards the received data signal SDT$_2$ as the transfer start signal START when it detects that the level of the signal SDT$_2$ has changed from the "L" level to the "H" level between the leading edge and trailing edge of the received clock signal SCK$_2$. Upon generation of the signal START, the latch signal LATCH is made inactive. Then, the received data signal SDT$_2$ is regarded as the transfer data signal D$_0$ while the unit 3 detects that the level of the signal SDT$_2$ is unchanged between the leading edge and trailing edge of the received clock signal SCK$_2$. The transfer data signals D$_0$–D$_n$ are output after the transfer start signal START is inactivated. The signal SDT$_2$ is regarded as the transfer end signal END when the level of the signal SDT$_2$ is detected to change from the "H" level to the "L" level between the leading edge and trailing edge of the received clock signal SCK$_2$, thereby activating the latch signal LATCH.

The hatched portions shown in FIG. 5 indicates time periods in which the logic level is maintained as it is.

FIG. 6 shows a specific structure of the timing circuit 31 shown in FIG. 3. Reference numerals 51–54 denote D-type flip-flop circuits, numerals 55 and 56 inverters, numeral 57 an AND gate having two input terminals, numeral 58 a NOR gate having two input terminals, numerals 59 and 60 NOR gates each having two input terminals and one output terminal, and numeral 61 a NOR gate having three input terminals. The output terminal of one of the NOR gates is connected to one of the input terminals of the other NOR gate, while the output terminal of the second-mentioned gate is connected to one of the input terminals of the first-mentioned gate. The first flip-flop circuit 51 has a data input terminal D for receiving the data signal SDT$_2$, a clock input terminal CK for receiving an inverted clock signal $\overline{SCK}$ obtained by inverting the received clock signal SCK$_2$ by the inverter 55, and an output terminal Q for outputting the data signal SDTA. The second flip-flop circuit 52 has a data input terminal D for receiving the data signal SDT$_2$, a clock input terminal CK for receiving the clock signal SCK$_2$, and an output terminal Q. A signal A output from the terminal Q is inverted by the inverter 56, and then input into the AND gate 57, together with the received data signal SDT$_2$. The output from the inverter 56 is input into the NOR gate 58, together with the received data signal SDT$_2$. The third flip-flop circuit 53 has a data input terminal D for receiving the output of the AND gate 57, a clock input terminal CK for receiving the inverted clock signal $\overline{SCK}$, and an output terminal Q for outputting a signal B (the transfer start signal START). The signal B is input into the NOR gate 61, together with the inverted clock signal $\overline{SCK}$. The fourth flip-flop circuit 54 has a data input terminal D for receiving the output of the NOR gate 58, a clock input terminal CK for receiving the inverted clock signal $\overline{SCK}$, and an output terminal Q for outputting the latch signal LATCH. One of the two input terminals of the NOR gate 59 receives the latch signal LATCH (transfer end signal END), and one of two input terminals of the NOR gate 60 receives the signal B (transfer start signal START). The output of the NOR gate 60 is input into the NOR gate 61, which in turn outputs the clock signal SCKA.

FIG. 7 shows waveforms useful in explaining the operation of the timing circuit 31 shown in FIG. 6. The circuit 31 starts signal reception upon detection of the transfer start signal START. Subsequently, it generates, upon detection of the received clock signal SCK$_2$ and serial data signals SDT$_2$, the clock signal SCKA (having the same phase as the clock signal SCK) and the data signal SDTA (this signal is 180°, out of phase with respect to the clock signal SCK, and varies at the time corresponding to the trailing edge of the clock signal SCK). Then, when the circuit 31 detects the transfer end signal END, it stops the generation of the clock signal SCKA and data signal SDTA, and simultaneously activates the latch signal LATCH.

In the above-described embodiment, although the data signal SDT$_1$ is transmitted which has logic levels being identical between the leading edge and trailing edge of the transfer clock signal SCK$_1$, the present invention can be modified, as shown in A–D of FIG. 2, such that the transfer apparatus 1 transmits a sub-data SBD whose logic level is inverted temporarily between the leading and trailing edges of the transfer clock signal SCK$_1$, and the receiving terminal unit 3 detects whether or not the data signal is temporarily inverted therebetween, thereby enabling the transmission of the sub-data SBD, as well as the main data SDT.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data transfer system comprising:

a data transfer means of transmitting clock signals and binary data signals, the data signals being transmitted in serial order, said data transfer means starting a data transfer sequence by transmitting a start data signal which has a first logic level at a time corresponding to a leading edge of a clock signal and second logic level at a time corresponding to the trailing edge of said clock signal, said data transfer means transmitting transfer data signals after the start signal, the transfer data signals having identical logic levels at times corresponding to the leading edge and trailing edge of a clock signal, and said data transfer means further transmitting a transfer end signal at the end of said data sequence, said end signal having said second logic level at a time corresponding to a leading edge of a clock signal and said first logic level at the time corresponding to the trailing edge of said clock signal;

a clock signal-transfer line connected to the data transfer means;

a data signal-transfer line connected to the data transfer means; and at least one data receiving terminal unit connected to the clock signal-transfer line and data signal-transfer line, the data receiving terminal unit regarding the data signal transmitted from said data transfer means as a transfer start signal when it detects that the data signal transmitted at a time corresponding to the leading edge of a clock signal transmitted from the data transfer means has said first logic level, and that the data signal transmitted at the time corresponding to the trailing edge of said clock signal has said second logic level, said data receiving terminal further regarding the data signal as a transfer data signal when it detects that the data signal transmitted at a time corresponding to the leading of a clock signal has the same logic level as that transmitted at the time corresponding to the trailing edge of said clock signal, and the data receiving terminal further regarding the data signal as a transfer end signal when it detects that the data signal transmitted at a time corresponding to the leading edge of a clock signal has said second logic level, and that the data signal transmitted at the time corresponding to the trailing edge of said clock signal has said first logic level.

2. The system according to claim 1, wherein the receiving terminal unit comprises a timing circuit for receiving the clock signals and the data signals which are transmitted from the data transfer means through the clock signal-transfer line and the data signal-transfer line, respectively, the timing circuit starting data reception upon detection of the transfer start signal, generating clock signals and data signals corresponding to the received clock signals and the received data signals upon detection thereof, and stopping the generation of the clock signals and data signals upon detection of the transfer end signal, and simultaneously activating a latch signal, the data receiving terminal further comprising a shift register for receiving the generated data signals in serial order at times corresponding to the leading edge of the generated clock signals, and a latch circuit for latching data transmitted from the shift register upon activation of the latch signal, and a decoding the serial data into parallel data.

3. The system according to claim 2, wherein the receiving terminal unit further comprises a counter for counting the clock signals generated by the timing circuit, thereby detecting the number of bits of data transmitted from the time at which the transfer start signal is detected to the time at which the transfer end signal is detected, and the receiving terminal unit receives the data signals transmitted from the data transfer means only if the bit number detected is a predetermined value.

4. A method of transmitting data, comprising the steps of:

transmitting clock signals from a data transfer means to at least one receiving terminal unit connected to the data transfer means via a clock signal-transfer line;

transmitting binary data signals in serial order from the data transfer means to the receiving terminal unit connected to the data transfer means via a data signal-transfer line;

making the data receiving terminal regard the data signal transmitted from the data transfer means as a transfer start signal when the data receiving terminal detects that the data signal transmitted at a time corresponding to a leading edge of a clock signal transmitted from the data transfer means ha a first logic level, and that the data signal transmitted at the time corresponding to the trailing edge of said clock signal has a second logic level;

making the data receiving terminal regard the data signal as a transfer data signal when it detects that the data signal transmitted at a time corresponding to the leading edge of the clock signal has the same logic level as that transmitted at the time corresponding to the trailing edge of said clock signal; and making the data receiving terminal regard the data signal as a transfer end signal when it detects that the data signal transmitted at a time corresponding to the leading edge of the clock signal has the second logic level, and that the data signal transmitted at the time corresponding to the trailing edge of said clock signal has the first logic level.

5. The method according to claim 4, further including the step of receiving said clock signals and data signals by at least one receiving terminal, each of said at least one receiving terminals including a timing circuit, a shift register, and a latch circuit, each of said receiving terminals receiving said clock signals and data signals from the clock signal-transfer line and data signal-transfer line, respectively, said step of receiving said clock signals and said data signals including the steps of starting data reception upon detection of the transfer start signal;

generating clock signals and data signals corresponding to the received clock signals and received data signals upon reception thereof from the data transfer means;

inputting the generated data signals serially into a shift register;

stopping the generation of clock signals and data signals upon detection of the transfer end signal;

activating a latch signal causing a latch circuit to latch the data from said shift register; and decoding the serial data into parallel data.

6. The method according to claim 5, wherein each of said receiving terminal units further comprises a counter for counting the clock signals generated by the timing circuit, said step of receiving said clock signals and said data signals further including the steps of counting the number of data bits transmitted from the time at which the transfer start signal is detected to the time at which the transfer end signal is detected, and accepting the data signals transmitted only if the bit number counted is a predetermined value.

7. A method of transmitting data to at least one data receiver, comprising the steps of:

transmitting clock signals having leading and trailing edges on a clock signal line;

transmitting a data transfer start signal on a data line by transmitting a signal having a first logic level at a time corresponding to the leading edge of a first clock signal and a second logic level at a time corresponding to the trailing edge of the first clock signal;

transmitting data signals; and transmitting a data transfer end signal on said data line by transmitting a signal having a first logic level at a time corresponding to the leading edge of a final clock signal and a second logic level at a time corresponding to the trailing edge of the final clock signal.

8. The method according to claim 7 wherein transmitting data signals comprises transmitting signals having the same logic levels at times corresponding to the leading and trailing edges of clock signals.

9. The method according to claim 7 further comprising the step of:

transmitting subdata signals at times corresponding to times between the leading and trailing edges of at least one clock signal.

10. The method according to claim 7 wherein the second logic level of the data transfer start signal is the same as the first logic level of the data transfer end signal.

11. A method of receiving data transmitted over a data transfer line, comprising the steps of:

receiving clock signals having leading and trailing edges on a clock signal line;

detecting a data transfer start signal by detecting a signal on said data transfer line having a first logic level at a time corresponding to the leading edge of a first clock signal and a second logic level at a time corresponding to the trailing edge of the first clock signal;

detecting data signals; and detecting a data transfer end signal by detecting a signal on said data transfer line having a first logic level at a time corresponding to the leading edge of a final clock signal and a second logic level at a time corresponding to the trailing edge of the final clock signal.

12. The method according to claim 11 wherein detecting data signals comprises detecting signals having the same logic levels at time corresponding to the leading and tailing edges of clock signals.

13. The method according to claim 11 further comprising the step of:

receiving subdata signals at times corresponding to times between the leading and trailing edges of at least one clock signal.

14. A data receiver comprising:

a first input terminal for receiving clock signals having leading and trailing edges;

a second input terminal for receiving data signals from a data signal line;

a timing circuit for detecting data signals during an interval defined by data transfer start and end signals, said timing circuit including data transfer start signal detecting means for detecting a signal at said second input terminal having a first logic level at a time corresponding to the leading edge of first clock signal and a second logic level at a time corresponding to the trailing edge of the first clock signal and data transfer end signal detecting means for detecting a signal at said second input terminal having a first logic level at a time corresponding to the leading edge of a final clock signal and a second logic level at a time corresponding to the trailing edge of the final clock signal; and a register for receiving the detected data signals.

15. A data receiver according to claim 14 wherein said register comprises a shift register.

16. A data receiver according to claim 14 further including latch circuitry for latching data in said register.

17. A data receiver according to claim 14 wherein said timing circuit includes a plurality of flip-flop circuits.

18. A data receiver according to claim 14 wherein said data receiver is adapted to receive signals for controlling a servomotor in a video tape recorder.

19. A data receiver according to claim 14 wherein said timing circuit comprises:

a first flip-flop circuit having a data input terminal coupled to said second input terminal, a clock input terminal, and an output terminal for outputting data signals;

a first inverter having an input terminal coupled to said first input terminal and an output terminal coupled to the clock input terminal to said first flip-flop circuit;

a second flip-flop circuit having a data input terminal coupled to said second input terminal, a clock input terminal coupled to said first input terminal, and an output terminal;

a second inverter having an input terminal coupled to the output terminal of said second flip-flop circuit and an output terminal;

an AND logic gate having a first input terminal coupled to said second input terminal, a second input terminal coupled to the output terminal o said second inverter, and an output terminal;

a third flip-flop circuit having a data input terminal coupled to the output terminal of said AND logic gate, a clock input terminal coupled to the output terminal of said first inverter, and an output terminal;

a first NOR logic gate having a first input terminal coupled to said second input terminal, a second input terminal coupled to the output terminal of said second inverter, and an output terminal;

a fourth flip-flop circuit having a data input terminal coupled to the output terminal of said first NOR logic gate, a clock input terminal coupled to the output terminal of said first inverter, and an output terminal for outputting a signal when the data transfer end signal is received;

a second NOR logic gate having a first input terminal coupled to the output terminal of said third flip-flop circuit, a second input terminal, and an output terminal;

a third NOR logic gate having a first input terminal coupled to the output terminal to said fourth flip-flop circuit, a second input terminal coupled to the output terminal of said second NOR logic gate, and an output terminal coupled to the second input terminal of said second NOR logic gate; and a fourth NOR logic gate having a first input terminal coupled to an output terminal of said third NOR logic gate, a second input terminal coupled to the output terminal of said third flip-flop circuit, a third input terminal coupled to an output terminal of said first inverter, and an output terminal for outputting clock signals.

* * * * *